з,267,331
Patented August 16, 1966

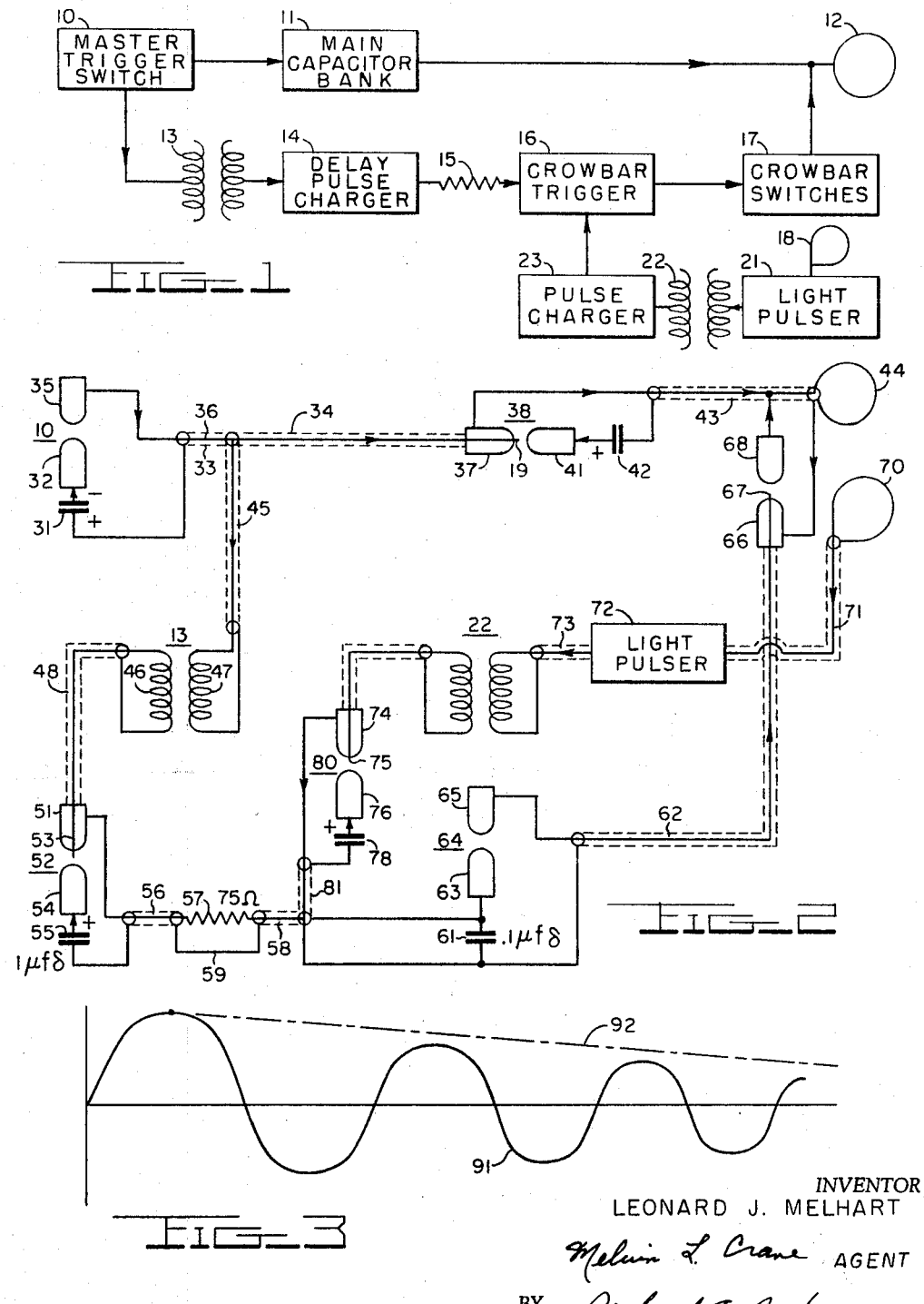

3,267,331
CAPACITOR TRIGGER AND FAULT CIRCUIT
Leonard J. Melhart, Oxon Hill, Md., assignor to the United States of America as represented by the Secretary of the Navy
Filed May 15, 1963, Ser. No. 280,758
6 Claims. (Cl. 317—9)

The invention described herein may be manufactured and used by or for the Government of the United States of America for governmental purposes without the payment of any royalties thereon or therefor.

The present invention is directed to an electrical discharge circuit and more particularly to a capacitor trigger and fault circuit in an electrical discharge circuit.

Heretofore, large capacitor discharges have been used to carry out high temperature research, such as described in application Serial No. 833,650, filed August 31, 1959, now Patent No. 3,089,831, as well as other types of research. In such circuits, many high voltage capacitors are used in a delay circuit which are controlled by many switches such as those of Patent No. 2,936,390. Other such switches may be vacuum switches, such as shown and described in application Serial No. 213,556, filed July 30, 1962. Such vacuum switches are used in a crowbar or shorting circuit connected across a load coil which permits current to flow through the crowbar circuits while aiding to maintain a magnetic field in the load coil. Such a continuous field is desired in the device described in application Serial No. 833,650.

In carrying out the above-described research, a main capacitor bank of a plurality of capacitors is discharged through a coil load. The capacitor discharge produces an axial magnetic field in the coil which compresses a gas in an insulated container within the coil, thereby producing for a limited time a thermonuclear reaction. The reaction is produced mainly in the first half-cycle of the discharge after which the gases escape to the wall surface of the container. The addition of a crowbar circuit connected to the coil permits a continuous current flow from the coil through the crowbar circuit thereby maintaining a magnetic field for a much longer time, thus preventing the magnetically confined gas from hitting the wall of the coil for a much longer period. A crowbar switch is a device to short out a large capacitor at the instant it is delivering maximum current and the potential difference across it is zero. This prevents the energy from being restored in the capacitor. With respect to the energy already in the coil at this instant, it provides a circulatory path for the current which decays with a characteristic time of $L/R$. The crowbar circuit is controlled by spaced electrodes which prevent a current flow across the spacing until the gas between the electrodes is ionized. Ionization of the gas between the spaced electrodes permits a current flow through the crowbar circuit which is connected to the coil. Therefore, the main discharge circuit has associated therewith a delay circuit which controls a capacitor discharge in which the capacitor discharges across the gap spacing of the crowbar switches, thereby controlling the crowbar circuit. A plurality of crowbar switches is used, of which there is a possibility of one crowbar switch prefiring, which would permit excessive current flow through the single switch, thereby blowing up the switch and possibly destroying some very valuable equipment. For this reason, a fault circuit is privided which detects the prefiring of one of the crowbar switches, and by suitable circuitry, causes the rest of the crowbar switches to fire, thereby preventing any damage to the equipment. It is much better to prefire all of the crowbar switches, which negates the experimental run than it is to permit one of the switches to prefire and ruin the equipment by which the experiments are conducted.

It is, therefore, an object of the present invention to provide a simple capacitor trigger and fault circuit.

Another object is to provide a safety circuit for firing a plurality of high energy vacuum switches should a fault occur.

Still another object is to detect a fault and to fire a plurality of vacuum switches upon the prefiring of one of the switches.

Yet another object is to provide a delay generator for a plurality of control switches.

The nature of this invention, as well as other objects and advantages thereof, will be readily apparent from consideration of the following specification relating to the annexed drawing, in which:

FIG. 1 illustrates a circuit diagram in block form,
FIG. 2 illustrates a schematic of the electrical circuit of the present invention, and
FIG. 3 illustrates a capacitor discharge curve with a dotted line representative of a magnetic field in the load coil due to the crowbar circuit.

The present invention is directed to an electrical circuit which includes a master trigger switch that controls the discharge of a main capacitor bank to a load, and a delay circuit which controls the firing of a plurality of crowbar switches which also controls a circuit through the load. In case one of the plurality of crowbar switches prefires, completing a circuit through the crowbar circuit across the load, a fault pickup operates to control a capacitor discharge that makes all of the plurality of crowbar switches fire and to complete an electrical circuit through all of the crowbar switches to the load.

Now, referring to the drawings, there is shown in block diagram and in a schematic form an electrical circuit suitable for carrying out the teaching of the present invention. As shown, the circuit includes a master trigger switch 10 for controlling a main capacitor bank 11 which supplies a load current to a coil 12. The master trigger switch also supplies a current to a pulse transformer 13 which is electrically connected to a delay pulse charger 14. The delay pulse charger directs an output pulse through a resistor 15 to a crowbar switch trigger 16 from which a current is directed to a plurality of crowbar switches 17. The crowbar switches are connected across the circuit from the main capacitor bank to the load coil. A crowbar switch fault detector 18 is positioned in the vicinity of the crowbar switch 17 and connected with a light pulser 21. The light pulser is connected electrically with a pulse charger 23 which is connected to the crowbar switch trigger 16 from which an electrical discharge from the pulse charger is directed to the crowbar switches in the crowbar circuit.

For a more detailed description, reference will be made to FIG. 2 which shows a schematic of the electrical circuit for carrying out the teaching of the present invention. A 0.1 mfd. capacitor 31 is connected with the negative side to one electrode 32 of the master trigger switch 10 and the positive side is connected with the outer conductor 33 of a coaxial cable 34. The other electrode 35 of the master trigger switch is connected with the inner conductor 36 of the coaxial cable 34. The outer conductor of coaxial cable 34 is connected with an electrode 37 of the main capacitor bank switch 38 and the inner conductor of coaxial cable 34 is connected with a triggering electrode 19 that extends through the main capacitor bank switch electrode 37. An electrode 41 of the main capacitor bank switch 38 is in axial alignment with electrode 37 and connected to the positive side of an 85 mfd. capacitor bank 42, which has the negative side thereof connected to the outer conductor of a coaxial cable 43. The capacitor bank is shown as a single capacitor for simplification. The electrode 37 is connected with the inner conductor of coaxial cable 43 which transmits current from capacitor 42 through the main capacitor bank switch 38 to a load coil 44.

Another coaxial cable 45 is connected electrically at one end with coaxial cable 34 and at the other end with an input coil 47 of pulse transformer 13. The output coil 46 of the transformer 13 is connected with a coaxial cable 48 that connects the transformer output to an electrode 51 of a delay pulse charger switch 52 and a trigger electrode 53. The delay pulse charger switch includes an electrode 54 which is connected to the positive side of a 1.0 mfd. capacitor 55. The negative side of the capacitor 55 is connected with the outer conductor of a coaxial cable 56. The inner conductor of coaxial cable 56 is connected with the electrode 51 of the delay pulse charger switch 52. A 75 ohm resistor 57 is connected in the line circuit between the inner conductors of coaxial cables 56 and 58 and the outer conductors of cables 56 and 58 are connected by a conductive wire 59. The electrical conductors of coaxial cable 58 are connected electrically across a 0.10 mfd. capacitor 61. One side of the capacitor 61 is connected to the outer conductor of coaxial cable 62 and the other side of the capacitor 61 is connected to electrode 63 of the crowbar triggering switch 64. Electrode 65 of the crowbar triggering switch is spaced about 3/16 inch in air from electrode 63 and connected to the center conductor of coaxial cable 62. The outside conductor of coaxial cable 62 is connected to an electrode 66 of a plurality of vacuum crowbar switches (such as described in application Serial No. 213,556, filed July 30, 1962) while the center conductor is connected with triggering electrode 67 that passes through electrode 66. Electrode 66 is also electrically connected to the load coil. The other electrode 68 of the vacuum crowbar switches are connected to the positive side of the load coil to complete a circuit through crowbar switch electrodes 66 and 68 with the load coil, the purpose of which will be explained later.

Fault detectors 70 are positioned adjacent to each crowbar switch to detect a prefiring of one of the vacuum crowbar switches. The fault detector is connected electrically by coaxial cable 71 with a light pulser 72 such as a thyratron which produces a pulse that is directed into the input of the pulse transformer 22. Through the coaxial cable 73 the output of the pulse transformer is connected with an electrode 74 and a trigger electrode 75 that passes through the electrode 74 into the air space between electrode 74 and an axially aligned electrode 76 of a fault pulse charger switch 80. Electrode 76 is connected to the positive side of a fault pulse charger capacitor 78. The negative side of the capacitor 78 is connected to the outer conductor of a coaxial cable 81. The center conductor of the cable 81 is connected to electrode 74 of the fault pulse charger switch 80. The opposite end of cable 81 is connected to coaxial cable 58 to complete a circuit from the capacitor 78 across the capacitor 61.

In operation of the system, capacitors 31, 42, 55, and 78 are charged by a suitable voltage source not shown for simplification of the drawings. Capacitor 31 is discharged through master trigger switch 10 which provides a voltage on the trigger electrodes 19 of the main capacitor bank switches 38 and the pulse transformer 13. The trigger electrodes 19 ionize the air between electrodes 37 and 41 which permits the main capacitor bank to discharge through the main switch 38 and supply a high current through the load coil 44. Simultaneously, the pulse transformer 13 produces a pulse on trigger electrode 53 and electrode 51, which ionizes the air between electrodes 51 and 54 of switch 52. Ionization of the air between electrodes 51 and 54 of switch 52 permits capacitor 55 to discharge through the switch 52 and delay resistor 57 to charge the crowbar trigger capacitor 61. The value of the resistor, the spacing of electrodes 63 and 65 of switch 64, and the size of the capacitor 61 are such that the charging time of the capacitor over- volts the gap spacing of switch 64 at a desired delay time. The values given above will provide an eight microsecond delay. Other delay times can be obtained by varying the resistance value of resistor 57, the gap spacing of switch 64, the capacitance of the capacitor 61, or the voltage on capacitor 55.

The delay in permitting capacitor 61 to discharge through switch 64 delays the pulse applied to trigger electrodes 67 of crowbar switches 17 to complete the circuit from the load coil through the crowbar switches. The completed circuit from the main discharge capacitors to the load coil and from the load coil through the crowbar switches have an effect on the magnetic field produced in the load coil by the discharge current of the main capacitor bank.

FIG. 3 represents a series of electrical current discharge cycles 91 from the main discharge bank through the coil. In carrying out research with such a coil as described in application Serial No. 833,650, filed August 13, 1959, the magnetic field produced on the first half-cycle of the main capacitor bank discharge produces the magnetic field of greatest value. After the first half-cycle, some of the gases confined by the magnetic field escape and hit the walls of the chamber which cools the gases down below the desired temperature. The circuit through the crowbar switches to the load coil permits currents in the load coil to circulate in the closed path through the crowbar switches to effectively maintain the magnetic field in the coil over several cycles of the discharge from the main capacitor bank. Therefore, the crowbar circuit is triggered at the top of the first half-cycle discharge from the main capacitor bank and stretches out the effective magnetic field per discharge as shown by dotted line 92 in FIG. 3.

There are a plurality of crowbar switches through which the currents circulate, therefore, it is important that all of the crowbar switches fire at the same time. If one crowbar switch prefires then all of the current from the main discharge circuit would pass through that one crowbar switch. Thus, the switch would blow up and possibly ruin other equipment. Therefore, the fault circuit is provided. The fault detectors detect the prefiring of one of the crowbar switches and sends an electrical pulse to the thyratron pulser, which produces a pulse on the pulse transformer 22. The pulse transformer 22 produces an output pulse that triggers the spark gap switch 80 to permit capacitor 78 to discharge through spark gap switch 80 thereby pulse charging capacitor 61 which discharges through spark gap switch 64 to trigger the crowbar switches 17. Since all of the crowbar switches are now triggered the current from the main discharge line will be divided between all of the crowbar switches. Thus no damage will occur in the crowbar switch that prefired or in the rest of the equipment.

Therefore, if all of the crowbar switches function correctly, the crowbar switches will be triggered at a specific delay time with respect to the main capacitor discharge whereas if one of the crowbar switches prefires, the crowbar switches will fire due to the fault detector circuit but before the necessary delay time. However, it is better to prefire the crowbar switches than it is to damage some of the equipment.

The drawing is a schematic of a system that includes a plurality of switches that control a plurality of capacitors that supply over a plurality of coaxial cables a high current to single coil. The drawing is only representative and those skilled in the art are familiar with the circuit.

Obviously many modifications and variations of the present invention are possible in the light of the above teachings. It is therefore to be understood that within the scope of the appended claims the invention may be practiced otherwise than as specifically described.

What is claimed is:
1. In an electrical circuit for producing a capacitor discharge through a load coil which comprises:
   (a) a load coil,
   (b) a main capacitor bank discharge circuit including said load coil,
   (c) a crowbar circuit connected electrically across said load coil,
   (d) a pulse delay circuit connected with said crowbar circuit for electrically completing said crowbar circuit subsequent to completion of an electrical discharge through said load coil, and
   (e) a trigger circuit for triggering said main capacitor discharge circuit and said pulse delay circuit.

2. In an electrical circuit for producing a capacitor discharge through a load coil which comprises:
   (a) a load coil,
   (b) a main capacitor bank dicharge circuit including said load coil,
   (c) a plurality of main spark gap switches in said main capacitor bank discharge circuit,
   (d) a crowbar circuit connected electrically across said load coil,
   (e) a plurality of vacuum spark gap switches in said crowbar circuit,
   (f) a pulse delay circuit connected with said plurality of vacuum spark gap switches in said crowbar circuit for electrically completing said crowbar circuit subsequent to completion of an electrical discharge through said load coil, and
   (g) a trigger circuit for triggering said plurality of main spark gap switches in said main capacitor discharge circuit and said pulse delay circuit to said vacuum spark gap switches in said crowbar circuit.

3. In an electrical circuit as claimed in claim 2, which includes a fault detector circuit connected into said pulse delay circuit to detect a prefiring of any of said vacuum spark gap switches in said crowbar circuit.

4. In an electrical circuit for producing a capacitor discharge through a load coil which comprises:
   (a) a load coil,
   (b) a main capacitor discharge circuit including said load coil,
   (c) a plurality of spark gap switches in said main capacitor discharge circuit,
   (d) a crowbar circuit connected electrically across said load coil,
   (e) a plurality of vacuum spark gap switches in said crowbar circuit for completing said crowbar circuit,
   (f) a pulse delay circuit connected with said plurality of vacuum spark gap switches in said crowbar circuit for electrically completing said crowbar circuit subsequent to completion of an electrical discharge through said load coil,
   (g) said pulse delay circuit including a resistor and a chargeable capacitor controlled by a spark gap switch, and
   (h) a trigger circuit for triggering said plurality of spark gap switches in said main capacitor discharge circuit and said pulse delay circuit to said vacuum spark gap switches in said crowbar circuit.

5. In an electrical circuit as claimed in claim 4, which includes a fault detector circuit connected into said pulse delay circuit to detect a prefiring of any of said vacuum spark gap switches in said crowbar circuit.

6. In an electrical circuit for producing a capacitor discharge through a load coil which comprises:
   (a) main capacitor bank for discharging a high current through a load,
   (b) a plurality of main capacitor bank spark gap switches for controlling a discharge from said main capacitor bank,
   (c) a pulse charger capacitor,
   (d) a spark gap switch for controlling a discharge from said pulse charger capacitor,
   (e) a master trigger capacitor bank,
   (f) a master trigger switch for controlling a discharge by said master trigger capacitor bank,
   (g) said master trigger capacitor on discharging through said master trigger switch producing a pulse for triggering said plurality of main capacitor bank switches and said pulse charger spark gap switch,
   (h) said main capacitor bank producing a pulse on said load through said triggered main capacitor spark gap switches,
   (i) a plurality of crowbar vacuum switches in an electrical circuit connected with the circuit from said main capacitor bank to said load,
   (j) an electrical circuit connected across said load,
   (k) a plurality of vacuum gap switches connected in said electrical circuit across said load,
   (l) a vacuum trigger switch capacitor connected with said vacuum gap switches to trigger said switches,
   (m) a gap switch connected to control said vacuum trigger switch capacitor,
   (n) said pulse charger capacitor connected across said vacuum trigger switch capacitor to charge said vacuum trigger switch capacitor at a predetermined rate, and
   (o) a pulse delay resistor in the circuit from said pulse charge capacitor to said vacuum trigger switch capacitor.

References Cited by the Examiner
UNITED STATES PATENTS

| | | | |
|---|---|---|---|
| 2,946,923 | 7/1960 | Fitch | 315—173 X |
| 3,052,819 | 9/1962 | Dazey | 315—242 |
| 3,089,831 | 5/1963 | Kolb | 315—11 X |
| 3,141,111 | 7/1964 | Godlove | 315—228 X |

MILTON O. HIRSHFIELD, *Primary Examiner.*

SAMUEL BERNSTEIN, *Examiner.*

R. V. LUPO, *Assistant Examiner.*